(12) United States Patent
Ishii et al.

(10) Patent No.: US 7,537,074 B2
(45) Date of Patent: May 26, 2009

(54) CONSTRUCTION MACHINE

(75) Inventors: Hajime Ishii, Kouka (JP); Tomoyuki Tanaka, Kouka (JP); Shogo Kimura, Kouka (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 286 days.

(21) Appl. No.: 10/588,200

(22) PCT Filed: Feb. 18, 2005

(86) PCT No.: PCT/JP2005/003082

§ 371 (c)(1),
(2), (4) Date: Aug. 2, 2006

(87) PCT Pub. No.: WO2005/083186

PCT Pub. Date: Sep. 9, 2005

(65) Prior Publication Data

US 2007/0131262 A1    Jun. 14, 2007

(30) Foreign Application Priority Data

Feb. 26, 2004   (JP) .............................. 2004-051984

(51) Int. Cl.
*B62D 33/06* (2006.01)

(52) U.S. Cl. .............................. 180/89.12; 296/190.08; 296/190.09

(58) Field of Classification Search .............. 180/89.12; 296/190.01, 190.08, 190.09
See application file for complete search history.

(56) References Cited

U.S. PATENT DOCUMENTS

| 4,088,364 | A  | * | 5/1978 | Termont ................ 296/190.09 |
| 6,450,284 | B1 | * | 9/2002 | Sakyo et al. ................ 180/329 |
| 6,752,228 | B2 | * | 6/2004 | Aoyama et al. .......... 180/89.12 |
| 7,290,829 | B2 | * | 11/2007 | Umemoto et al. ....... 296/190.08 |
| 2006/0170251 | A1 | * | 8/2006 | Ishii et al. .............. 296/190.09 |
| 2007/0145780 | A1 | * | 6/2007 | Tecklenburg et al. ... 296/190.08 |

FOREIGN PATENT DOCUMENTS

| JP | 7-35212 | 6/1995 |
| JP | 2001-55760 | 2/2001 |
| JP | 3261611 | 12/2001 |
| JP | 2002-13161 | 1/2002 |
| JP | 2002-121770 | 4/2002 |

* cited by examiner

*Primary Examiner*—John Q. Nguyen
*Assistant Examiner*—Drew J. Brown
(74) *Attorney, Agent, or Firm*—Mattingly & Malur, P.C.

(57) ABSTRACT

A washer tank is integrally formed with a front air duct, and the washer tank and the front air duct are installed within a cab. Thus, the washer tank can be installed within the cab by the use of spaces around the air duct. This arrangement makes it possible to install the washer tank within the cab in an unintrusive way and in the vicinity of a washer liquid spout nozzle without necessitating to provide an installation space exclusively for the washer tank.

7 Claims, 9 Drawing Sheets

CONSTRUCTION MACHINE

TECHNICAL FIELD

This invention relates to a cab-equipped construction machine such as a hydraulic excavator, hydraulic crane, wheel loader or the like.

BACKGROUND ART

Generally, hydraulic excavators are well known as a construction machine. Hydraulic excavators of this sort are largely constituted by an automotive vehicular lower structure, an upper revolving structure rotatably mounted on the vehicular lower structure, and a working mechanism liftably provided in a front side of the upper revolving structure. A cab is built on a revolving frame of the upper revolving structure, and an operator's seat is provided within the cab to be taken by an operator. On certain cab-equipped hydraulic excavator, an air-conditioning unit is installed to send conditioned air into a cab through an air duct for providing an improved working environment.

Further, along with a wiper which is provided on a front window pane of a cab for wiping water droplets from the front window pane, a washer liquid spout nozzle is usually provided for the purpose of spurting a washer liquid onto the front window pane. The washer liquid spout nozzle is supplied with a washer liquid from a washer tank, which is located, for example, within an inner space of a cab (e.g., see Japanese Utility Model Laid-Open No. H7-35212). In some cases, a washer tank is located within an engine room which is provided in a rear side of a cab (e.g., see Japanese Patent Laid-Open No. 2002-13161).

By the way, in a case where a washer tank is located within a cab as in the above-mentioned Japanese Utility Model Laid-Open No. H7-35212, it becomes necessary to provide a washer tank installation space exclusively within the cab. However, in the case of small-size hydraulic excavator with a limited accommodation space within a cab, it is difficult to find an installation space for a washer tank. Therefore, if a washer tank is installed within a cab, it could obstruct the view field of an operator or stick out into the dwelling space to such a degree as to give an oppressive feeling to the operator.

Further, in the case of small-size hydraulic excavator, it is difficult to install a washer tank within an engine room as in above-mentioned Japanese Patent Laid-Open No. 2002-13161 because usually an engine room is crowded with engine and hydraulic equipments. Even if one has succeeded in installing a washer tank within an engine room, it becomes necessary to connect the washer tank with a nozzle by the use of a long hose, which has greater possibilities of being crushed or damaged en route to the hose, making it difficult to give an assurance in performance quality.

DISCLOSURE OF THE INVENTION

In view of the above-discussed problems with the prior art, it is an object of the present invention to provide a construction machine having a washer tank installed within a cab in the vicinity of a washer liquid spout nozzle in such a way as to ensure improved comfortableness to drive in and operational reliability as well, without necessitating to provide an installation space exclusively for the washer tank.

(1) According to the present invention, there is provided a construction machine which is comprised of a vehicular body having a working mechanism in front side portion thereof, a hollow cab mounted on the vehicular body and provided with a front window pane on the front side thereof, an operator's seat furnished within the cab and to be taken by an operator, an air duct provided within the cab to supply conditioned air toward air outlets, a washer liquid spout nozzle provided on a front window pane to spurt a washer liquid thereon, and a washer tank holding a washer liquid for supply to the spout nozzle.

In order to achieve the above-stated objective, the construction machine of the present invention is characterized in that the washer tank is integrally joined with the air duct and installed in the cab.

With the arrangements just described, as a result of integration of the washer tank with the air duct, the washer tank can be installed within the cab by the use of a space around the air duct. Namely, the washer tank can be installed within the cab in an unintrusive way, without necessitating to provide an installation space exclusively for the washer tank.

Thus, the washer tank is installed in an unintrusive way, precluding the possibilities of obstructing the view field of an operator by the washer tank or giving an oppressive feeling to an operator by protruding into a dwelling space. Namely, the washer tank is installed in such a way as to ensure comfortableness and working efficiency within the cab. Besides, installation of the washer tank within the cab means that it can be located near the washer liquid spout nozzle, and connected to the latter by the use of a short hose which is less susceptible to damages, that is to say, which has higher operational reliability. The integration of the washer tank with the air duct has another advantage that, in case of operations in a cold district, the washer liquid in the washer tank can be heated by warm air streams in the air duct, that is to say, which precludes the possibilities of freezing the washer liquid.

(2) According to the present invention, the operator's seat is located within the cab at a position set apart from the front window pane by a space of a predetermined breadth, and the air duct and the washer tank are located forward of the operator's seat and on the side of the space.

In this case, the air duct and the washer tank can be located at one side of a space between the front window pane of the cab and the operator's seat. That is to say, the washer tank can be located in a position which will not obstruct operator's view field or lever handling actions.

(3) According to the present invention, an entrance opening is provided in one side section of the cab for getting into or out of the operator's seat, the operator's seat is located within the cab at a position set apart from the front window pane by a space of a predetermined breadth, and the air duct and the washer tank are located forward of the operator's seat and on the opposite side of the entrance opening of the cab.

In this case, the air duct and the washer tank are located forward of the operator's seat and on the opposite side from the entrance opening of the cab. That is to say, the washer tank never comes into the way of an operator at the time of getting into or out of the operator's seat.

(4) According to the present invention, the construction machine further comprises a floor panel internally provided with an air-conditioning unit accommodation compartment at the foot of the operator's seat, and an air-conditioning unit accommodated in the air-conditioning unit accommodation compartment in the floor panel and connected with the air duct to send out conditioned air.

In this case, the air duct can be connected to an air-conditioning unit which is installed in the cab by the use of a floor panel in front of the operator's seat.

(5) According to the present invention, the construction machine further comprises a duct cover adapted to cover the air duct and the washer tank, the duct cover having a filling inlet port projected upword therethrough to let a washer liquid changing into the washer tank.

With the arrangements just described, the air duct and the washer tank are covered with a decorative duct cover to improve the appearance of the duct-tank assembly. In addition, a filling inlet port of the washer tank is projected upward through the duct cover, allowing to refill a washer liquid into the washer tank easily through the projected filling inlet port.

(6) According to the present invention, the construction machine further comprises a duct cover adapted to cover the air duct and the washer tank, the duct cover containing a check-out window for checking out a washer liquid level in the washer tank.

With the arrangements just described, the air duct and the washer tank are covered with a decorative duct cover to improve the appearance of the duct-tank assembly. In addition, through a check-out window which is provided in the duct cover, an operator can check out the level of residual washer liquid in the washer tank to complete an initial check-out of a starting procedure in an efficient manner.

(7) According to the present invention, the washer tank is formed integrally with the air duct.

With the arrangements just described, the air duct and the washer tank can be installed at once, making an assembling work simple and efficient. Besides, the front air duct and the washer tank can be fablicated at a low cost.

(8) According to the present invention, the air duct and the washer tank are formed separately and then integrally joined or assembled together by the use of fixation means.

With the arrangements just described, separately formed air duct and washer tank integrally assembled together by the use of fixation means. In this case, it is possible to assemble together a diversity of air ducts and washer tank with a greater freedom in design.

BEST MODE FOR CARRYING OUT THE INVENTION

Hereafter, with reference to FIGS. 1 through 8, the present invention is described more particularly by way of its preferred embodiments which are applied by way of example to an automotive hydraulic excavator, which is considered as a construction machine.

Figure 1:
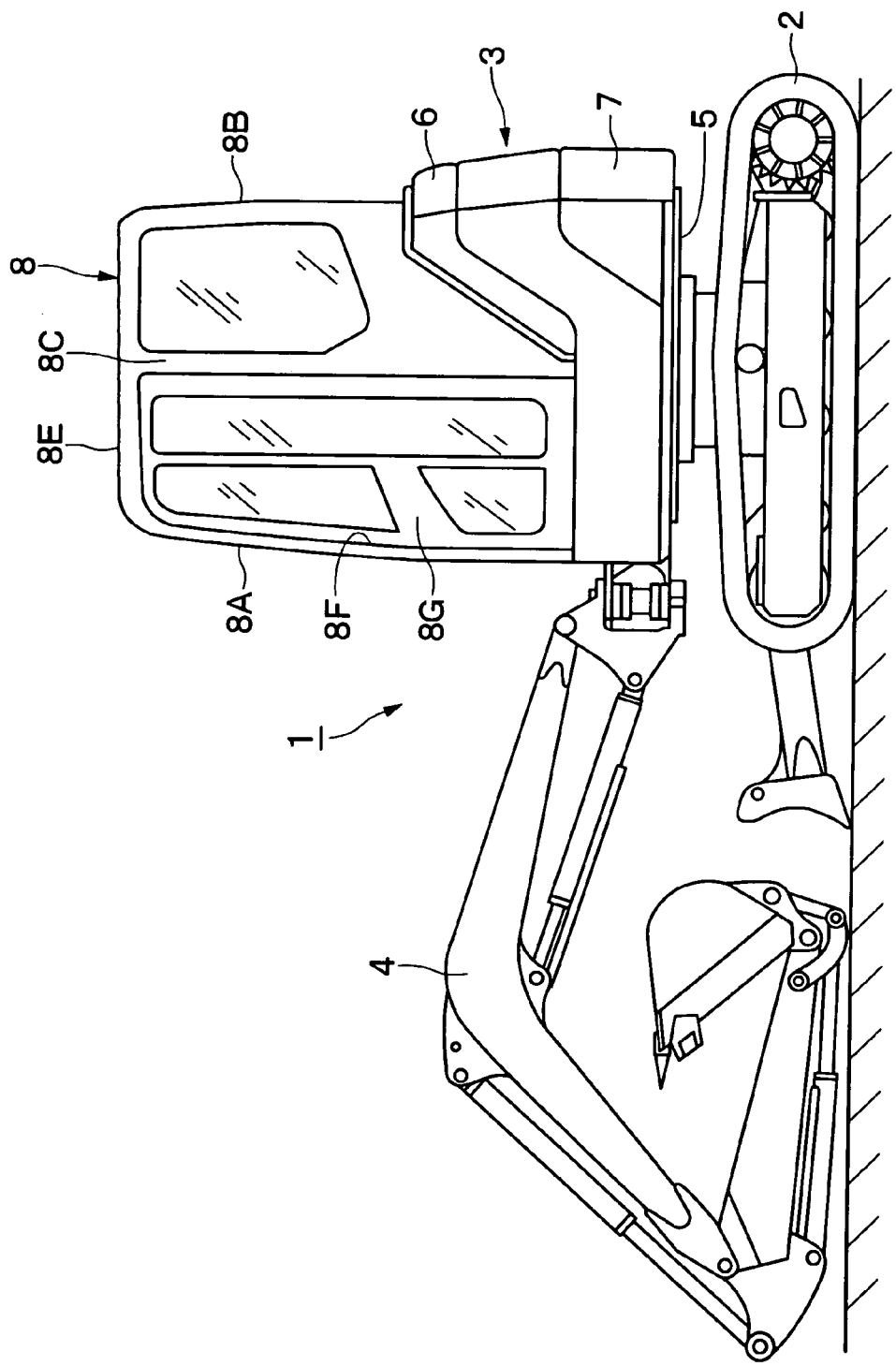
FIG. 1 is a front view of a hydraulic excavator according to an embodiment of the present invention.

In FIG. 1, indicated at 1 is a cab-equipped automotive hydraulic excavator typical of construction machines to which the present invention is applicable. The hydraulic excavator 1 is largely constituted by an automotive vehicular lower structure 2, an upper revolving structure 3 which is swingably mounted on the vehicular lower structure 2, forming a vehicle body together with the lower structure 2, and a working mechanism 4 which is liftably mounted in a front side of the upper revolving structure 3 to perform a ground excavating operation or other jobs.

In this instance, the upper revolving structure 3 is largely constituted by a revolving frame 5 which is formed, for example, by the use of thick steel plates, an engine and a hydraulic pump (both not shown) which are mounted in a rear side of the revolving frame 5, an exterior cover 6 which is provided from right to rear side of the revolving frame 5 to cover a fuel tank, operating oil tank, radiator, oil cooler and an engine (all not shown in the drawings), a counterweight 7 which is attached to the rear end of the revolving frame 5, and a cab 8 which is provided on a left front side of the revolving frame 5, which is descrived hereinafter. Further, provided within the cab 8 are a washer liquid spout nozzle 11, operator's seat 16, air ducts 24 and 26, a washer tank 27 and a duct cover 29 as described in greater detail hereinafter.

Figure 2:
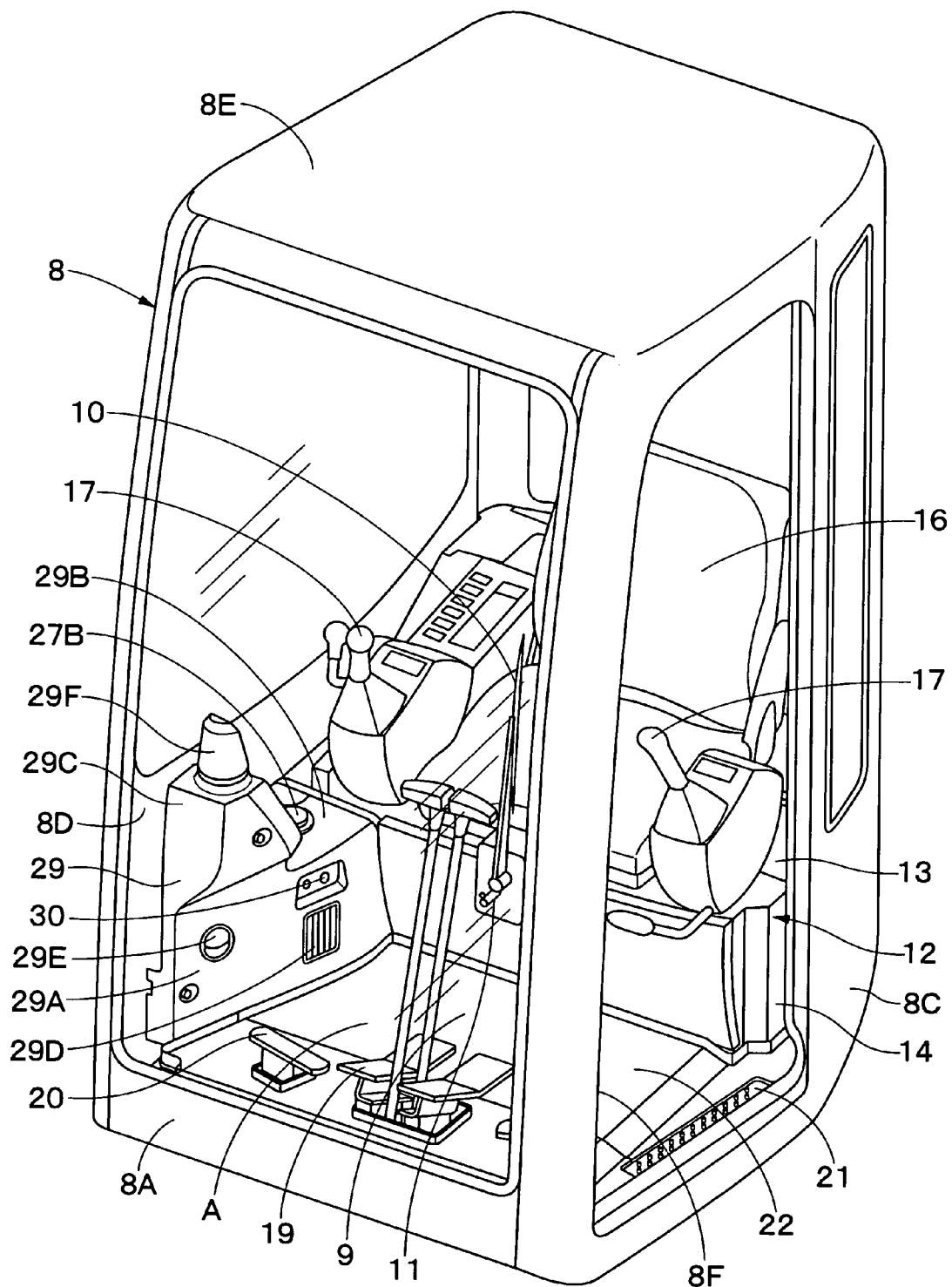
FIG. 2 is an enlarged perspective view of a cab, with a door of the cab removed to show the inside of the cab.

Denoted at 8 is a hollow cab which is provided in a left front side of the revolving frame 5, enclosing the ambience of the operator's seat to define an operating room for an operator at the control of various operations of the machine. As shown in FIGS. 1 and 2, the cab 8 is formed in a box-like shape including a front section 8A, a rear section 8B, a left side section 8C, a right side section 8D and a roof section 8E. An entrance opening 8F which get into or out of a machine for an operator is provided in a front portion of the left side section 8C, and a door 8G is openably fitted in the entrance opening 8F.

Further, a front window pane 9 is fitted in the front section 8A of the cab 8. Mounted on the front window pane 9 is a wiper unit 10 which is operative to wipe off water droplets on the front window pane 9, along with a washer liquid spout nozzle 11 which is operative to spurt a washer liquid onto the front window pane 9.

In the particular embodiment shown, the washer liquid nozzle 11 is provided on the front window pane 9, and in a position in the vicinity of the wiper unit 10 to spurt a washer liquid toward the front window pane 9. Further, by the use of a hose (not shown), the nozzle 11 is connected to a washer tank 27 which is located within the cab 8, which is described hereinafter.

Figure 3:
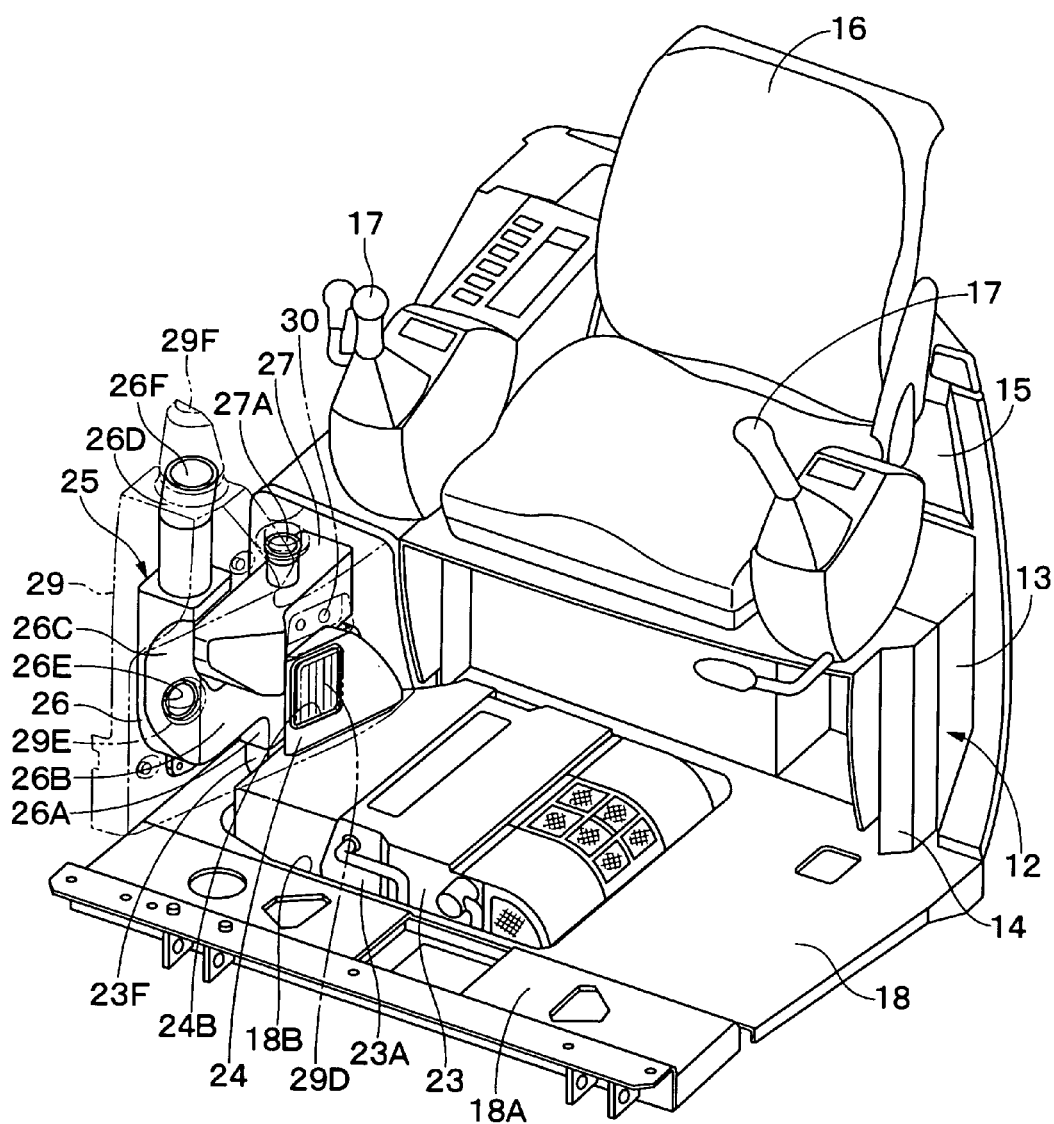
FIG. 3 is a perspective view of the cab, with enclosures of the cab removed to show a seat support stool, operator's seat, floor panel, air-conditioning unit, air-conditioning duct and washer tank within the cab.
Figure 4:
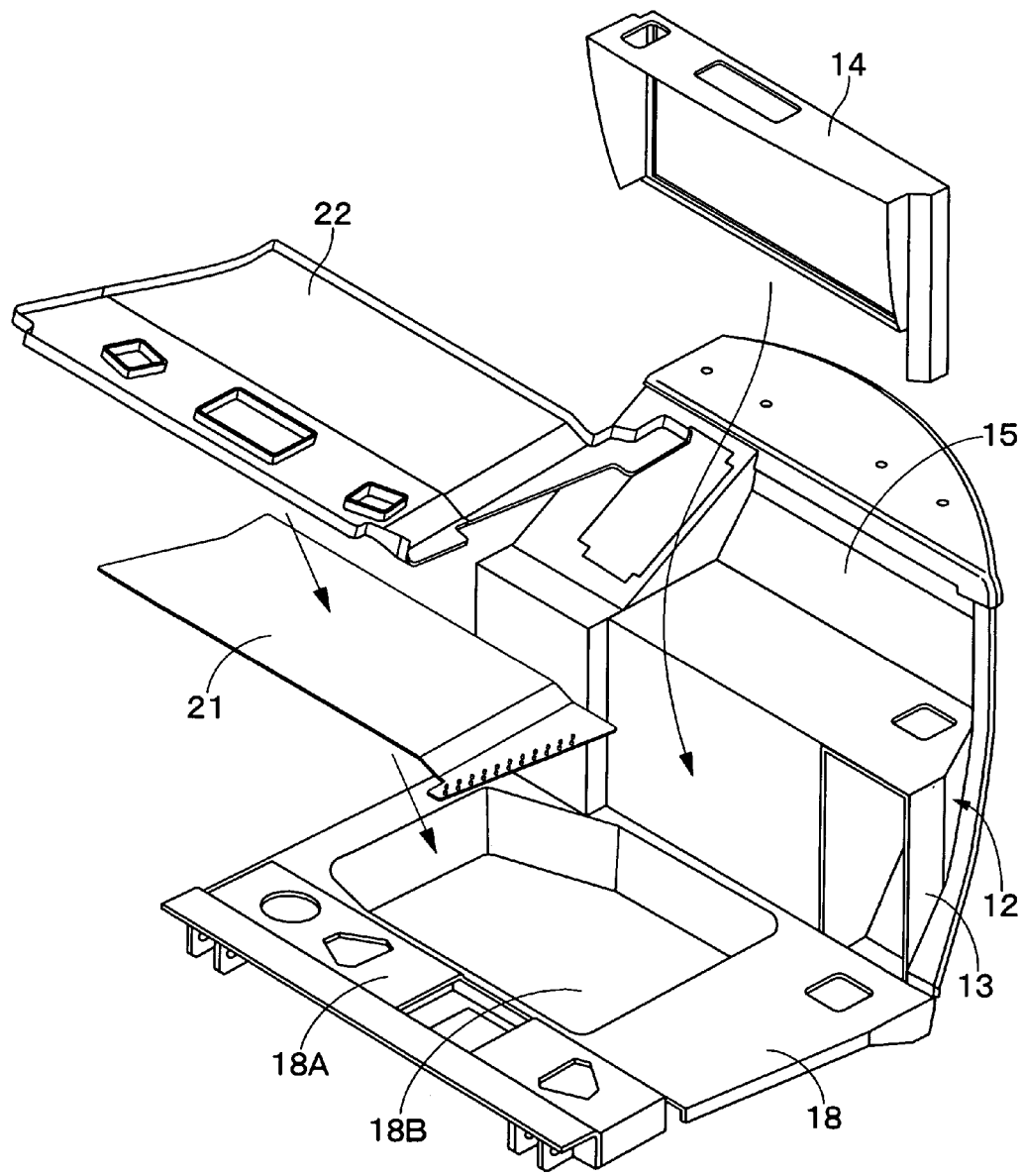
FIG. 4 is an exploded view, with a front stool, an upper floor panel and a floor mat disassembled from a rear stool and a lower floor panel.

Indicated at 12 is a seat support stool which is provided in a rear side of the revolving frame 5 in such a way as to close a lower rear portion of the cab 8. As shown in FIGS. 3 and 4, the seat support stool 12 is largely constituted by a rear stool 13 of a stair-like shape which is located on the rear side, a front stool 14 which is detachably attached to the front side of the rear stool 13, and a back panel 15 which is extended to lean backwards from the rear stool 13.

In this instance, the rear stool 13 and front stool 14 of the seat support stool 12 are built to support the operator's seat 16 which will be described hereinafter, while the rear stool 13 and the back panel 15 are arranged to serve also as a front engine cover which covers part of top and front sides of an engine. Further, the front stool 14 is removable at the time of detaching an upper floor panel 21, which will be described hereinafter, for the purpose of installing or dismantling the air-conditioning unit 23 or carrying out a maintenance work on the air-conditioning unit 23. The back panel 15 is attached to a rear portion of the cab 8.

The front stool 14 of the seat support stool 12 is detachably attached to the rear stool 13. Therefore, upon detaching the front stool 14, various valve devices and electrical parts (both not shown) which are accommodated within the rear stool 13 can be easily accessed at the time of a mounting or dismantling work or for maintenance and service. If desired, the separably assembled rear and front stools 13 and 14 of the seat support stool 12 may be formed into one integral structure.

Indicated at 16 is an operator's seat which is mounted on the rear and front stools 13 and 14, i.e., a seat to be seated by an operator at the control of the machine. This operator's seat 16 is provided in the cab 8 with a space A (indicated in FIG. 2) from the front window pane 9. In this instance, the space A has a sufficient breadth as a way-in and way-out space to and from the operator's seat 16 and at the same time as a working space for operating vehicle control lever/pedals 19 which will be described hereinafter. Further, provided at the right and left sides of the operator's seat 16 are control levers 17 to be manipulated by an operator for operating the working mechanism 4.

Indicated at 18 is a lower floor panel which is provided at the foot of an operator who is seated on the operator's seat 16, namely, a lower floor panel which is located under the space A and on the front side of the rear stool 13. As shown in FIG. 4, this lower floor panel 18 constitutes a lower layer of the floor panel of dual or double panel construction. An upper layer of the double layer floor panel structure is constituted by an upper floor panel 21 which will be described hereinafter. The lower floor panel 18 is formed in a rectangular shape having longer sides in the transverse direction. Rear end of the lower floor panel 18 is fixed to the front end of the rear stool 13 by the use of bolts or by welding.

On the other hand, a front end portion of the lower floor panel 18 is formed into a lever/pedal mount plate 18A which is mounted on a front portion of the revolving frame 5. Mounted on the lever/pedal mount plate 18A are vehicle drive control levers/pedals 19 which are operated when driving the lower structure 2, along with auxiliary pedals 20 which are operated when controlling an attachment (not shown) mounted on the working mechanism 4.

Further, in a sunken right-side section, the lower floor panel 18 is provided with an air-conditioning unit accommodation compartment 18B. The air-conditioning unit accommodation compartment 18B is a hollowed sunken space of substantially rectangular shape having longer sides in the transverse direction. As shown in FIG. 3, accommodated in the air-conditioning unit accommodation compartment 18B is an air-conditioning unit 23 which will be described hereinafter.

Designated at 21 is an upper floor panel (see FIG. 4) which is provided over the lower floor panel 18. As mentioned hereinbefore, the upper floor panel 21 constitutes an upper layer of a floor panel in the form of dual or double panel construction having the lower floor panel 18. Further, the upper floor panel 21 serves to cover the air-conditioning unit 23 which is accommodated in the air-conditioning unit accommodation compartment 18B in the lower floor panel 18.

Indicated at 22 is a floor mat which is spread on the lever/pedal mount plate 18A of the lower floor panel 18 and on the upper floor panel 21. This floor mat 22 is formed by the use of a resilient synthetic resin material, rubber or woven material.

Indicated at 23 is an air-conditioning unit which is accommodated in the air-conditioning unit accommodation compartment 18B in the lower floor panel 18. This air-conditioning unit 23 constitutes an air-conditioning system together with compressor and condenser (both not shown) of an outdoor unit which is mounted on the side of the engine. By this air-conditioning unit 23, intake air is conditioned into cool or warm air for supply to the cab 8.

Figure 5:
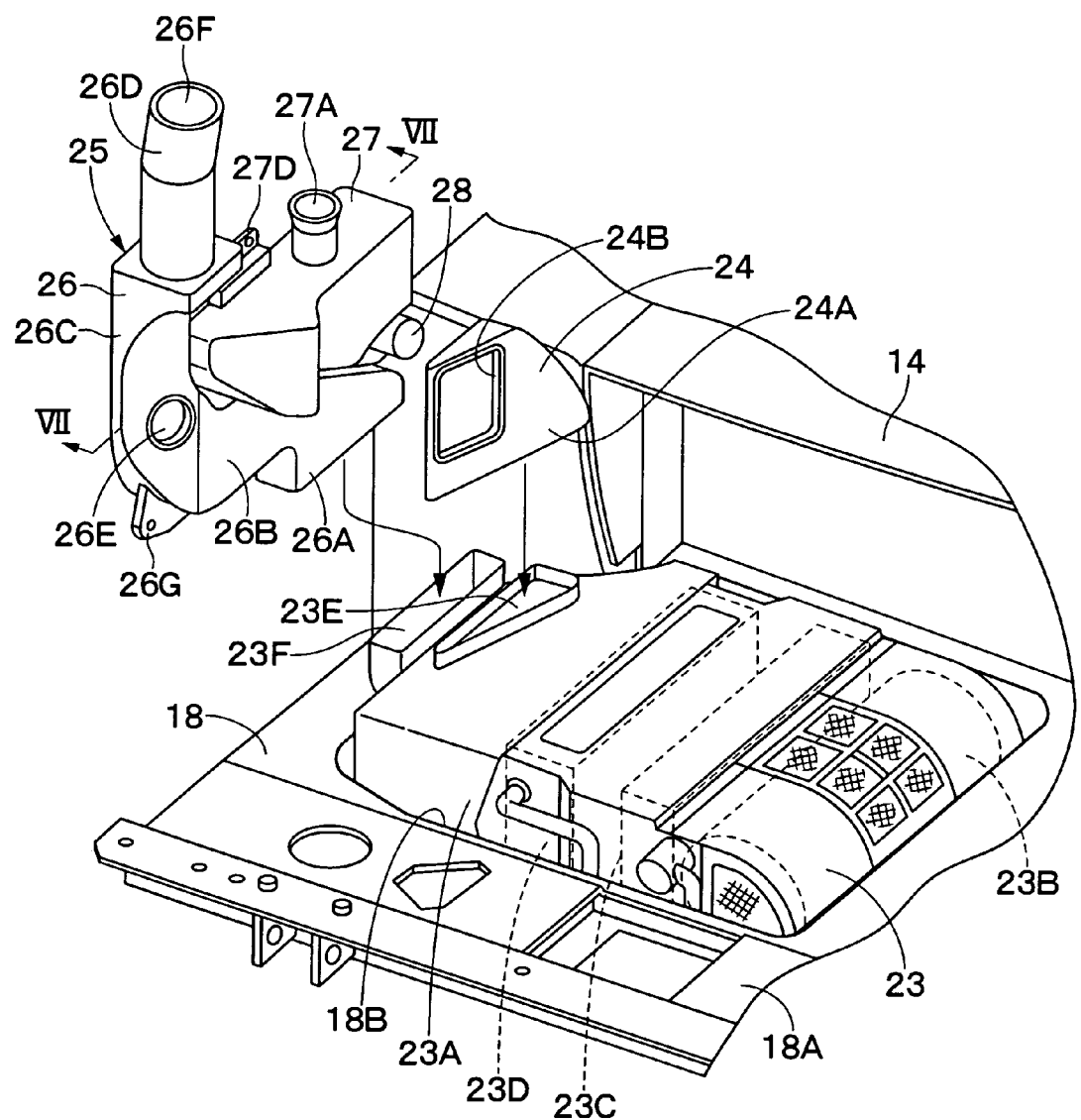
FIG. 5 is an enlarged exploded view, showing the air-conditioning duct of the air-conditioning unit of FIG. 3 in a disassembled state.

Further, as shown in FIG. 5, the air-conditioning unit 23 is largely constituted by a laterally extending box-like main casing 23A, an air fan 23B which is accommodated in a left-side of the main casing 23A, an evaporator 23C which is accommodated in the main casing 23A on the downstream side of the air fan 23B, a heater core 23D which is accommodated on the downstream side of the evaporator 23C, a foot side air outlet 23E which is accommodated in a right side of the main casing 23 to send out streams of conditioned air, and a front side air outlet 23F. The air-conditioning unit 23 supplies either cool air cooled by the evaporator 23C or warm air heated by the heater core 23D.

In this instance, the foot side air outlet 23E is provided to supply conditioned air to a foot side air outlet 29D in a duct cover 29 which will be described hereinafter, and connected with a foot side air duct 24 which will also be described later. The front side air outlet 23F is provided to supply conditioned air to a front air outlet 29E and an upper air outlet 29F of the duct cover 29, and connected with a front air duct 26 which will be described hereinafter.

Air is taken into the main casing 23A of the air-conditioning unit 23 as the air fan 23B is rotationally driven, and cooled by the evaporator 23C or heated by the heater core 23D to send conditioned air into the cab 8 through the foot side air outlet 23E and front side air outlet 23F and from the air outlets 29D, 29E and 29F of the duct cover 29 via air ducts 24 and 26, keeping the inside of the cab 8 at a suitable adjusted temperature.

Indicated at 24 is a foot side air duct which is located in a right side section within the cab 8, on the front side of a right control lever 17 of the operator's seat 16. This foot side air duct 24 is formed in a lengthy lidded tubular shape extending in a longitudinal direction and has a lower mount portion 24A connected to the foot side air outlet 23E of the air-conditioning unit 23. A connecting port 24B of a rectangular shape is opened in a left side surface of the foot side air duct 24 for connection of a foot side air outlet 29D of a duct cover 29, which will be described hereinafter. The foot side air duct 24 is provided to send conditioned air of the air-conditioning unit 23 to the foot side air outlet 29D.

Denoted at 25 is a duct-tank complex structure which is located in a right side of the cab 8, on the front side of the right control lever 17 of the operator's seat 16. This duct-tank complex structure 25 is formed by integration (integral forming) of a front air duct 26 and a washer tank 27, which will be described hereinafter. Further, the duct-tank complex structure 25 is provided along a right side section 8D of the cab 8 on the opposite side to the entrance opening 8F of the cab 8, in other words, on the right side of the space A which is provided on the front side of the operator's seat 16. The above-mentioned foot side air duct 24 is located within the duct-tank complex structure 25 (on the side of the space A).

Figure 6:
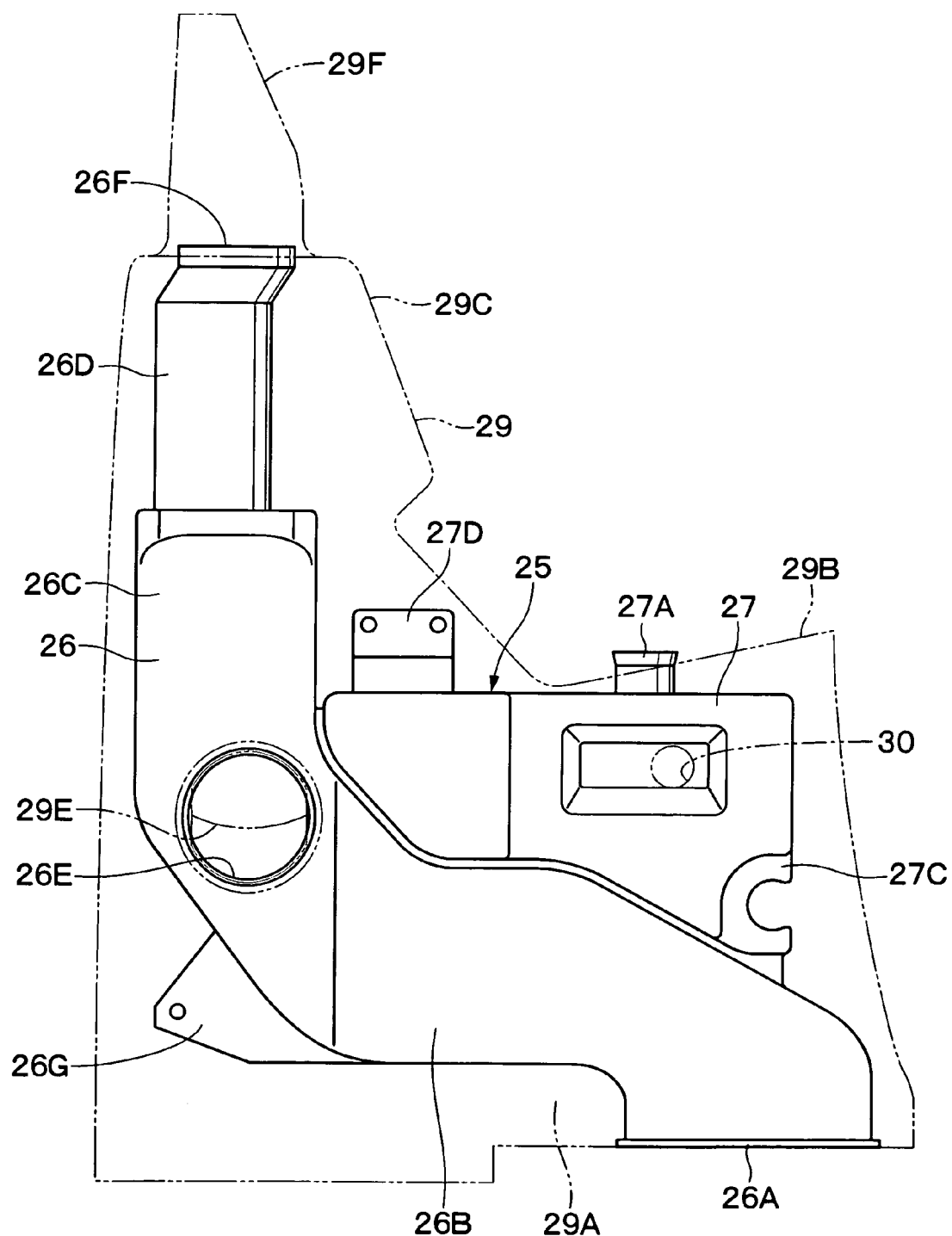
FIG. 6 is an enlarged front view of a duct-tank complex structure.
Figure 7:
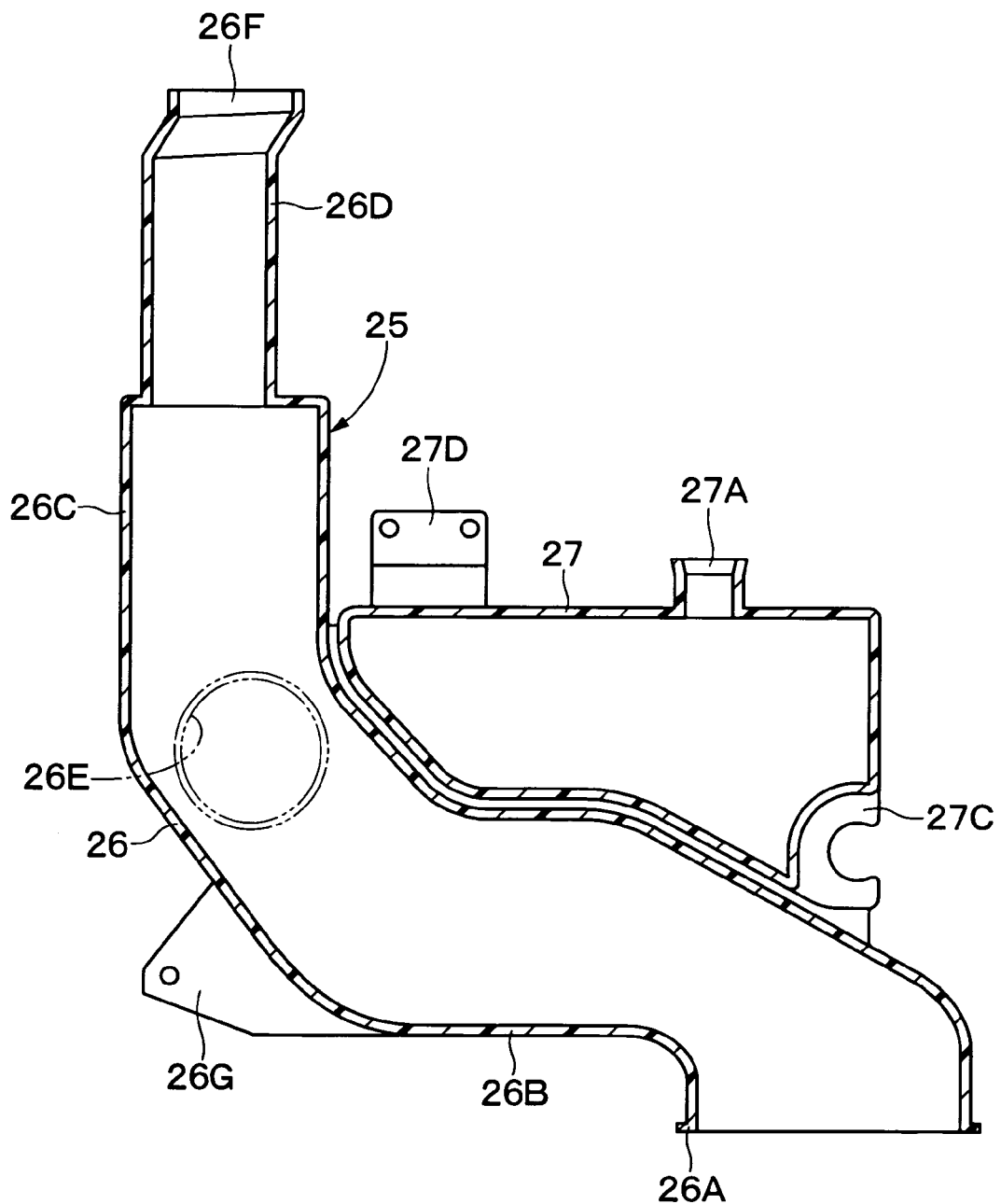
FIG. 7 is a sectional view of the duct-tank complex structure, taken in the direction of arrows VII-VII of FIG. 5.

In this instance, indicated at 26 is a front air duct which forms a part of the duct-tank complex structure 25. As shown in FIGS. 6 and 7, the front air duct 26 is largely constituted by a downwardly opened fitting tube portion 26A, a sidelong tube portion 26B which is extended forward from upper end of the fitting tube portion 26A, a vertical tube portion 26C which is extended vertically upward from fore end of the sidelong tube portion 26B, and a top tube portion 26D which is extended further upward from upper portion of the vertical tube portion 26C.

Opened in a lower portion of the vertical tube portion 26C is a lower connecting port 26E of a circular shape, to be connected to a front air outlet 29E of the duct cover 29 which will be described hereinafter. Upper end portion of the top tube portion 26D is terminated with an upper connecting port 26F to be connected to an upper air outlet 29F of the duct cover 29. Further, the front air duct 26 is provided with a bracket 26G at a bent portion between the sidelong tube portion 26B and the vertical tube portion 26C. The bracket 26G is mounted on the right side section 8D of the cab 8 by means of bolts (not shown) or the like.

The fitting tube portion 26A of the front air duct 26 is connected to a front side air outlet 23F of the air-conditioning unit 23 to supply conditioned air of the air-conditioning unit 23 to the front air outlet 29E and upper air outlet 29F of the duct cover 29.

Indicated at 27 is a washer tank which is integrally adjoined with the front air duct 26, forming the duct-tank complex structure 25 together with the front air duct 26. The washer tank 27 is located on and along the top side of the sidelong tube portion 26B of the front air duct 26. Further, the washer tank 27 is formed in the shape of a length box-like container which is extended from rear to front side, and formed integrally (integrate) with the front air duct 26. Furthermore, the washer tank 27 is formed of transparent or semi-transparent material by the use of a resin material at least at a part providing a check-out window 30 which will be described hereinafter. Therefore, after or when filling a washer liquid into the washer tank by way of the check-out window 30, one can check the level of the washer liquid. If desired, the entire body of the washer tank 27 may be formed of transparent or semi-transparent resin material.

A filling inlet port 27A is projected upward on the top side of the washer tank 27 for charging a washer liquid therethrough. The filling inlet port 27A is projected upward through a through hole 29G in an upper plateau portion 29B of the duct cover 29, which will be described hereinafter. Further, a cap 27B is removably fitted on the filling inlet port 27A (see FIGS. 2 and 3). A discharging outlet port (not shown) is provided at the bottom of the washer tank 27 to discharge the washer liquid. The just-mentioned discharging outlet port is connected to a washer pump 28 which will be described hereinafter. On the other hand, a C-shaped pump mount portion 27C is integrally provided at a lower side on the rear portion of the washer tank 27 and a washer pump 28 is mounted on the pump mount, portion 27C. Further, the washer tank 27 is provided with a bracket 27D at an upper front position. This bracket 27D is attached to a right side section 8D of the cab 8 by the use of bolts (not shown) or the like.

Designated at 28 is a washer pump which is fitted in the pump mount portion 27C of the washer tank 27 (see FIG. 5). This washer pump 28 is operative to send a washer liquid in a washer tank 27 to the nozzle 11 on the front window pane 9. Suction side of the washer pump 28 is connected to the discharging outlet port of the washer tank 27 through a suction hose (not shown), while discharging side of the washer pump is connected to the nozzle 11 on the front window pane 9 through a supply hose (not shown).

Figure 8:
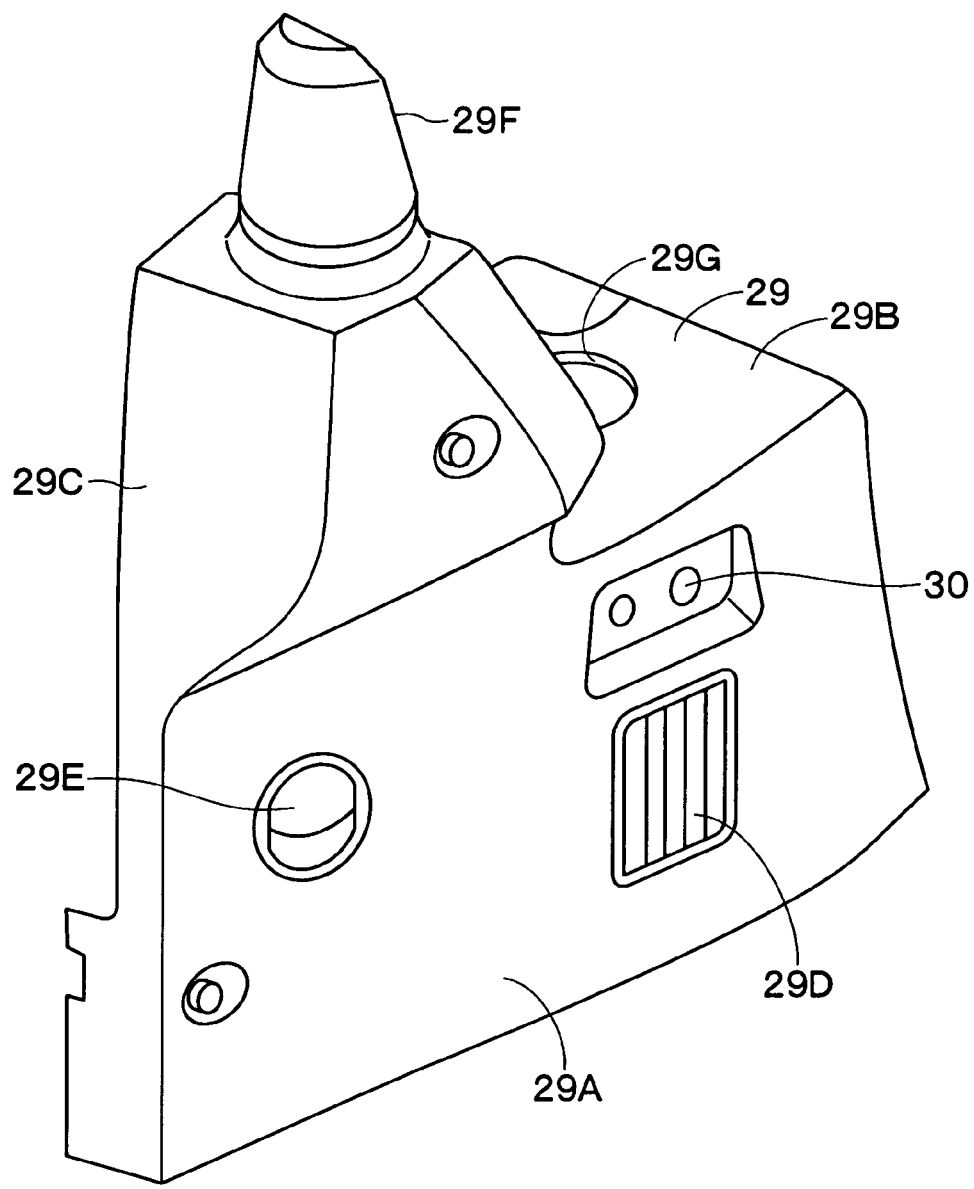
FIG. 8 is an enlarged perspective view of a duct cover alone.

Indicated at 29 is a duct cover which is located in a right side of the cab 8. This duct cover 29 is provided as a decorative cover for covering the foot side air duct 24 and the front air duct 26 and the washer tank 27 of the duct-tank complex structure 25. Further, the duct cover 29 is so located as to extend forward from a right front side position of the rear stool 13 along the right side section 8D of the cab 8. More specifically, as shown in FIGS. 2 and 8, the duct cover 29 is largely constituted by an upright cover portion 29A which is erected in transversely spaced relation with the right side section 8D of the cab 8, an upper plateau portion 29B which is extended transversely from a rear side of the top end of the upright cover portion 29A toward the right side section 8D, and a box-like monitor mount portion 29C which is projected upward from the front end portion of the upper plateau portion 29B and a front side of the top end portion of the upright cover portion 29A.

Further, the upright cover portion 29A is provided with a foot side air outlet 29D in a rear side position to blow off conditioned air toward the feet of an operator, along with a front air outlet 29E which is located in a front side position to blow off conditioned air toward the front window pane 9 as anti-fogging air. Furthermore, a monitor screen (not shown) is mounted on the rear side of the monitor mount portion 29C to display operating and working conditions of the machine for the operator. In addition, an upper air outlet 29F is provided at the top of the monitor mount portion 29C to blow off conditioned air toward an operator. Further, a through hole 29G is provided in the upper plateau portion 29B, and the filling inlet port 27A of the washer tank 27 is projected out of the through hole. Moreover, a check-out window 30 is provided near the upper side of the foot side air outlet 29D on the upright cover portion 29A.

In this instance, the check-out window 30 on the upright cover portion 29A of the duct cover 29 is located at a position on the upper side of the foot side air outlet 29D, that is to say, it is possible to check out from outside the level of the washer liquid in the washer tank 27.

Being arranged in the manner as described above, the hydraulic excavator 1 of the present embodiment operates in the manner as described below.

In the first place, in order to operate the hydraulic excavator 1, an operator opens the door 8G and gets into the cab 8 through the entrance opening 8F. Then, the operator can check out the level of the washer liquid in the washer tank 27 easily by peeping into the check-out window 30 in the duct cover 29. At this time, if the washer liquid level is found to be too low, the washer liquid can be easily refilled into the washer tank 27 by removing the cap 27B from the filling inlet port 27A.

Then, the operator who is seated on the operator's seat 16 can operate the vehicle drive control levers/pedals 19 to start the vehicular lower structure 2. Otherwise, by operating the control levers 17, the operator can operate the working mechanism 4 to carry out, for example, a ground excavating operation.

In case it becomes necessary to adjust the temperature within the cab 8, the operator can turn on the air-conditioning unit 23. By so doing, conditioned air from the air-conditioning unit 23 is sent into the cab 8 from the air outlets 29D, 29E and 29F of the duct cover 29 through the air outlets 23E and 23F, and the air ducts 24 and 26 to maintain the cab 8 at a comfortable adjusted temperature. In addition, the front window pane 9 can be prevented from fogging.

Further, in case of an operation in rainy weather, the wiper unit 10 is actuated to wipe off water droplets on the front window pane 9. Further, in case the front window pane 9 is smudged with dust or mud, a washer liquid is spurted onto the front window pane 9 from the nozzle 11, and the wiper unit 10 is actuated to wipe dust or mud off the front window pane 9.

Thus, according to the present embodiment, thanks to integration of the washer tank 27 with the front air duct 26, the washer tank 27 can be installed within the cab 8 in an unobtrusive way, utilizing a space around the front air duct 26, that is to say, without necessitating an exclusive installation space.

As a consequence, there is no possibility of the washer tank 27 obstructing the view field of the operator or protruding into the dwelling space in an obtrusive way. Namely, without giving an oppressive feeling to the operator within the cab 8, it is possible to improve comfortableness and working efficiency for the operator in the cab. Besides, since the washer tank 27 is installed within the cab 8 at a position in the vicinity of the nozzle 11, it is possible to improve reliability of the machine by the use of a short washer supply hose which has less possibilities of damages. Further, as a result of integration of the washer tank 27 with the front air duct 26, the washer liquid in the washer tank 27 can be heated by warm air streams in the front air duct 26 to prevent freezing of the washer liquid in a cold district.

Furthermore, the front air duct 26 and the washer tank 27 are located on the right side of the space A between the operator's seat 16 and the front window pane 9 of the cab 8 in such a way not to obstruct the view field or lever operations actions of an operator.

Moreover, the front air duct 26 and the washer tank 27 are located along the right side section 8D of the cab 8 on the opposite side from the entrance opening 8F and the operator's seat 16, there is no possibility of an operator being obstructed by the front air duct 26 and the washer tank 27 at the time of getting into or getting out of the cab 8 or when at the control of the machine, seated on the operator's seat 16. Further, the front air duct 26 and the washer tank 27 located along the right side section 8D of the cab 8 have sound insulating effects as well as heat insulating effects to provide improved comfortableness of the cab 8 in operating the machine.

On the other hand, the air ducts 24 and 26 and the washer tank 27 are covered in the duct cover 29 of good appearance to add to a nice look. Besides, the filling inlet port 27A of the washer tank 27 projected upward of the duct cover 29, so that a washer liquid can be easily charged into the washer tank 27 through the filling inlet port 27A.

Further, through the check-out window 30 which is provided in the duct cover 29, an operator can check out the level of residual washer liquid in the washer tank 27 and complete an initial check-out of starting procedure in an efficient manner.

Furthermore, the duct-tank complex structure 25 is constituted by forming the front air duct 26 and the washer tank 27 into one integral structure (by integral forming), the front air duct 26 and the washer tank 27 can be mounted in position at once simply by attaching the duct-tank complex structure 25 to the cab 8, permitting to carry out an assembling work in an efficient manner. Besides, the front air duct 26 and the washer tank 27 can be fabricated at a low cost.

Figure 9:
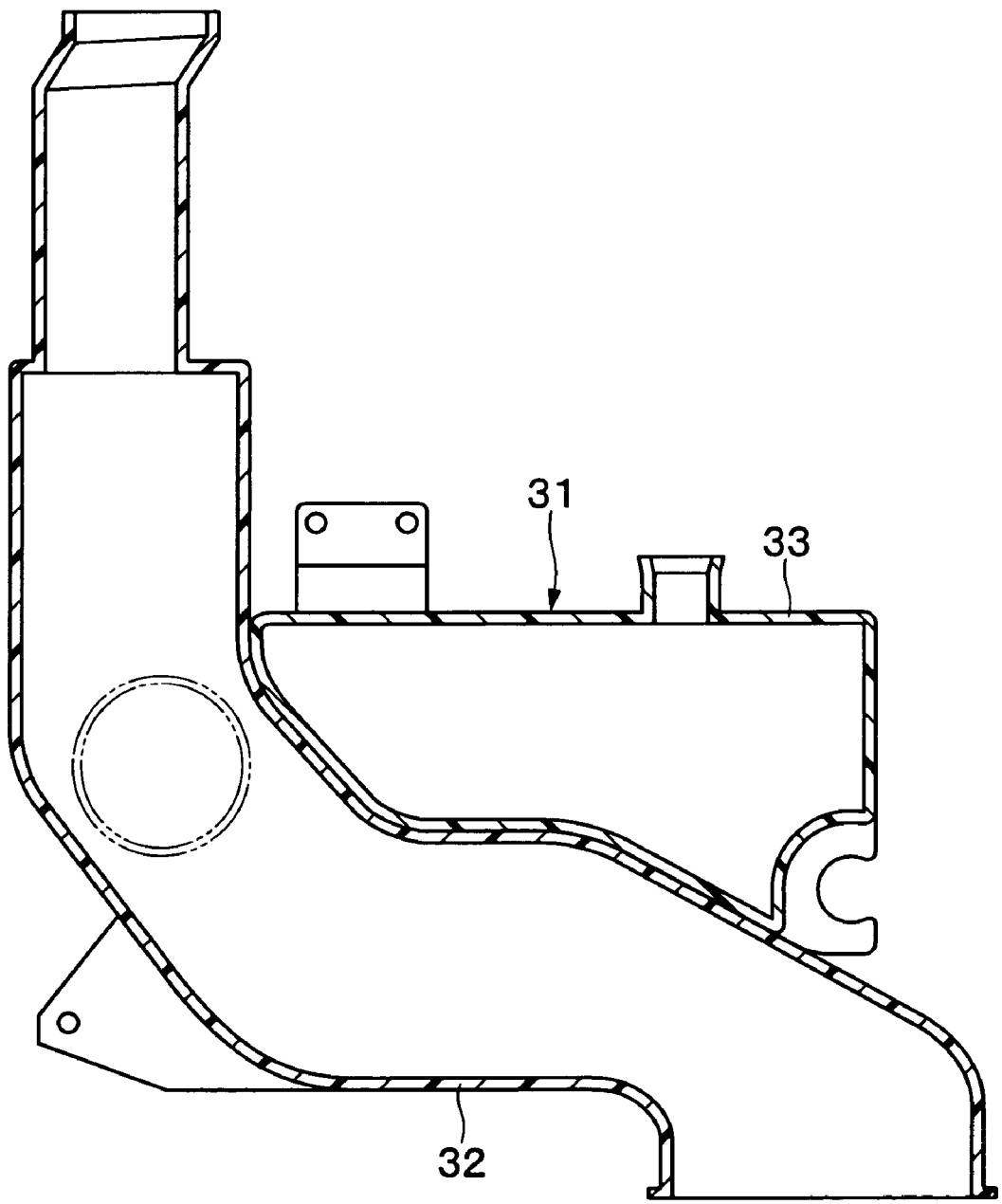
FIG. 9 is a sectional view taken from a position similar to FIG. 7, showing a modification of the present invention of the duct-cover complex structure.

In the above-described embodiment, by way of example the present invention is applied to the front air duct 26 and the washer tank 27 which are formed into one duct-tank complex structure 25 (by integral forming). However, in place of the duct-tank complex structure 25, the present invention can be applied to a duct-tank complex structure 31 which is shown as a modification in FIG. 9. In the case of the duct-tank complex structure 31, the front air duct 32 and the washer tank 33 are formed separately and afterwards assembled into one integral structure together by adhesion or welding or by the use of screws.

Further, in the above-described embodiment, by way of example two air ducts are provided including the foot side air duct 24 which supplies conditioned air toward the foot side and the front air duct 26 which supplies conditioned air to the front window pane 9 and to an operator who is seated on the operator's seat. However, it is to be understood that the present invention is not limited to the particular air duct arrangements shown. For example, it is possible to integrate the foot side air duct 24 and the front air duct 26 into one air duct which is arranged to supply conditioned air to the foot side in addition to the front window pane and an operator on the operator's seat. In such a case, the washer tank 27 (33) is attached to the single air duct.

Further, in the above-described embodiment, by way of example the cab is furnished with a floor panel of a double panel construction which is composed of the lower floor panel 18 and the upper floor panel 21, and the air-conditioning unit 23 is accommodated in the lower floor panel 18. However, in this regard the present invention is not limited to the particular arrangements shown. For example, the air-conditioning unit 23 may be located in a lower portion of the seat support stool 12 under the operator's seat 16 or may be located behind the seat support stool 12 or in any other place.

Furthermore, in the above-described embodiment, by way of example the cab 8 is built in a box-like shape having front section 8A, rear section 8B, left side section 8C, right side section 8D and roof section 8E. However, the present invention is not limited to cabs of this particular shape. For example, the present invention can be similarly applied to a cab the outer periphery of which is formed in an arcuate shape from left side to rear side, or to a cab of a cup form which is arcuately shaped as a whole from front to roof section and to rear section, or to a cylindrical cab which is formed in a cylindrical shape as a whole.

Moreover, in the above-described embodiment, the present invention is applied to a hydraulic excavator 1 as a typical example of construction machines. However, needless to say, the present invention can be similarly applied to other construction machines such as hydraulic cranes, wheel loaders and lift trucks.

The invention claimed is:

1. A construction machine comprised of a vehicular body having a working mechanism in a front side portion thereof, a hollow cab mounted on said vehicular body and provided with a front window pane on the front side thereof, an operator's seat furnished within said cab and to be taken by an operator, an air duct provided within said cab to supply conditioned air toward air outlets, a washer liquid spout nozzle provided on a front window pane to spurt a washer liquid thereon, and a washer tank holding a washer liquid for supply to said spout nozzle, wherein:
   said washer tank is integrally joined with said air duct and installed in said cab;
   a duct cover is adapted to cover said air duct and said washer tank; and
   said washer tank has a filling inlet port projected upward through the duct cover to receive a washer liquid charged into said washer tank.

2. A construction machine as defined in claim 1, wherein said operator's seat is located within said cab at a position set apart from said front window pane by a space of a predetermined breadth, and said air duct and said washer tank are located forward of said operator's seat and on the side of said space.

3. A construction machine as defined in claim 1, wherein an entrance opening is provided in one side section of said cab for getting into or out of said operator's seat, said operator's seat is located within said cab at a position set apart from said front window pane by a space of a predetermined breadth, and said air duct and said washer tank are located forward of said operator's seat and on the opposite side to said entrance opening of said cab.

4. A construction machine as defined in claim 1, further comprising a floor panel internally provided with an air-conditioning unit accommodation compartment at the foot of said operator's seat, and an air-conditioning unit accommodated in said air-conditioning unit accommodation compartment in said floor panel and connected with said air duct to send out conditioned air.

5. A construction machine as defined in claim 1, further comprising said duct cover containing a check-out window for checking out a washer liquid level in said washer tank.

6. A construction machine as defined in claim 1, wherein said washer tank is formed integrally with said air duct.

7. A construction machine as defined in claim 1, wherein said air duct and said washer tank are formed separately and then integrally joined or assembled together by the use of fixation means.

* * * * *